Patented May 6, 1952

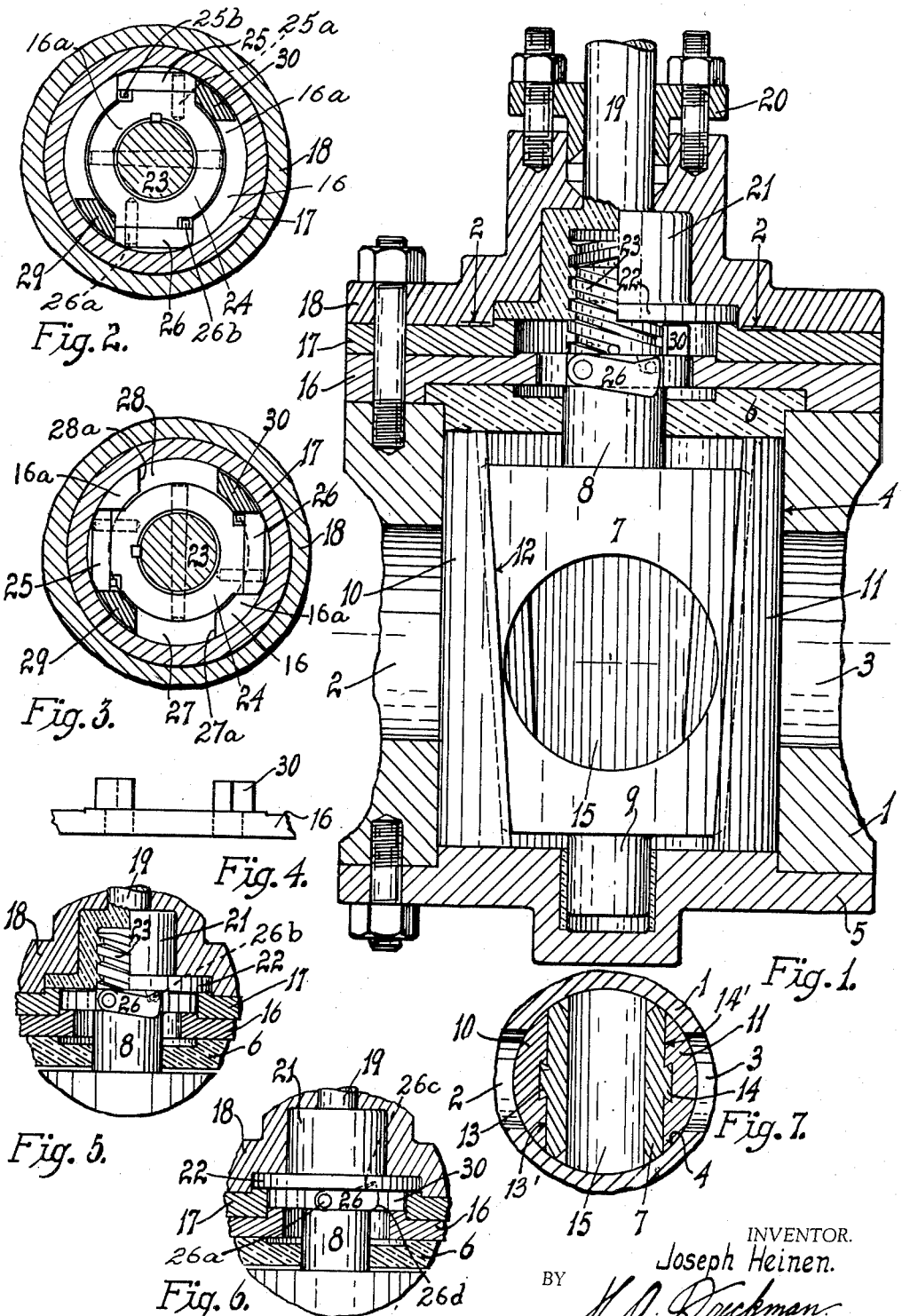

2,596,075

UNITED STATES PATENT OFFICE 2,596,075

VALVE

Joseph Heinen, Long Beach, Calif.

Application April 5, 1946, Serial No. 659,840

11 Claims. (Cl. 251—97)

This invention relates to a valve, particularly a valve to be used in the control of either fluids or gases.

An object of my invention is to provide a valve of the plug type, which is so constructed that the valve will not stick in either open or closed position and will operate effectively without lubricants and without scoring the valve body or the plug.

Still another object of my invention is to provide a valve in which the plug is moved vertically prior to the rotation of the plug into either open or closed position.

A feature of my invention is to provide a pair of wedges, which cooperate with the plug, these wedges extending over the passages in the body in the closed position of the valve, the plug in its vertical movement moving the wedges either inwardly or outwardly to free said wedges from engagement with the wall, or to press these wedges tightly against the wall of the body.

Still another object is to provide a valve with a novel pickup dog, which permits vertical movement of the plug before a rotary movement is imparted to the plug.

Still another feature is to provide a novel stop arrangement, cooperating with the dog, whereby the plug is accurately positioned into either open or closed position.

Still another feature is to provide a double seal for the valve in the closed position thereof. This provides a positive shut-off, particularly useful when the valve is used on high pressure lines, or where corrosive substances pass through the valve.

Still another advantage of my invention is to provide a valve in which the body can be drained when the plug is in the off position, even though there is pressure on the incoming line. This is particularly advantageous when used in connection with corrosive fluids.

Other objects, advantages and features of invention may appear from the accompanying drawing, the subjoined detailed description, and the appended claims.

In the drawing:

Figure 1 is a fragmentary, longitudinal, sectional view of my valve.

Figure 2 is a fragmentary, transverse sectional view taken on line 2—2 of Figure 1.

Figure 3 is a view similar to Figure 2 but showing the valve in open position.

Figure 4 is a fragmentary side view of the stop plate.

Figure 5 is a fragmentary, transverse sectional view of the vertical control mechanism.

Figure 6 is a view similar to Figure 5 and showing the dog engaged.

Figure 7 is a transverse sectional view of the plug and sealing wedges.

Referring more particularly to the drawing, the numeral 1 indicates a valve body, in which are formed two ports or passages 2, 3. A cylindrical bore 4 intersects the passages 2, 3 and the plug rotates in this bore, as will be further described. A plate 5 closes the lower end of the bore 4, and this plate may be bolted or otherwise attached to the body 1, or integral with said body. A bearing plate 6 fits in the upper part of the bore 4, and the purpose of this bearing plate will be further described.

A cylindrical plug 7 is provided with trunnions 8 and 9 on the top and bottom thereof respectively. The trunnions 8 and 9 are journaled in the plates 6 and 5 respectively, thus accurately positioning the plug 7. A pair of arcuate wedges 10, 11 are positioned within the bore 4, and these wedges extend from top to bottom of the bore—that is the wedges bear against the plates 5 and 6. The plug 7 is planed off on the two sides so as to receive the wedges 10 and 11, and the engaged surfaces of the plug 7 with the wedges are inclined as shown at 12. The plug 7 is somewhat shorter than the cylindrical bore 4 so that it can be moved vertically in order to actuate the wedges. The plug 7 and the wedges 10 and 11 have a sliding dovetail in connection, with a dovetail spline along the back of each wedge received in corresponding dovetail slots on opposite sides of the plug 7, as shown at 13 and 14 (Figure 7), thereby interlocking the plug and wedges so that the plug 7 can move vertically within the valve body, and, in so moving, the wedges 10 and 11 are moved inwardly or outwardly, but the wedges are not moved vertically. The flat engaging surfaces 13'—14' are large and extend from top to bottom to form a large bearing surface. It will be evident that when the wedges are in the position shown in Figure 7 and are pressed outwardly against the wall of the bore 4, the ports 2 and 3 will be effectively sealed. Before opening the valve, the wedges 10 and 11 are moved inwardly away from the wall of the bore 4, and then the plug 7 is rotated so as to bring the port 15 into alignment with the passages 2 and 3. With this arrangement, there is no galling or scoring of the valve body or the engaging faces of the wedges 10, 11, or the plug 7. The engaging faces of the wedges 10, 11 may be covered with a rubber or synthetic coating, particularly where corrosive fluids, gases, or chemicals might flow through the valve. It is to be noted that the wedges 10, 11 can be freed for rotary movement under high pressure.

This vertical movement of the plug 7 to control the wedges 10 and 11, and the means of rotating the plug 7, is accomplished as follows:

The stop plate 16, retainer plate 17, and cap 18 are all superimposed, and are attached to the body of the valve by means of bolts, studs or other suitable means. A control shaft 19 extends into the cap 18 through a packing gland 20. A cup 21 is formed on the lower end of the shaft 19, and is preferably integral with the shaft, and this cup is internally threaded. A flange 22 integral on the cup is engaged by the cap 18 to prevent vertical movement of the cup or the shaft 19. The trunnion 8 is provided with a threaded section 23 on the upper end thereof, these threads engaging the internal threads of the cap 21. It will be evident that when the shaft 19 is rotated, the threads 23 will move in the threaded cup 21 and will thus impart a vertical movement to the plug 7. This vertical movement of the plug will move the wedges 10 and 11 inwardly or outwardly, as previously described. A collar 24 is fixedly attached to the trunnion 8, and a pair of dogs 25, 26 are pivotally attached to the collar 24 by pins 25a and 26a respectively. The dogs 25 and 26 are pivoted at one end on pins 25a and 26a and have upward projections at the top of their opposite ends adapted to lock in recesses 26c (Figure 6) in the flange 22 when the dogs are raised and then pivoted upwardly, as will be further described. The dogs 25 and 26 have studs 25b and 26b (Figure 2) which are movable in suitable indentations in the collar 24 to permit the dogs to pivot on pins 25a and 26a, but are limited in their downward movement by engagement with the collar 24 to prevent the dogs from pivoting below a generally horizontal position (Figures 1 and 5).

A pair of oppositely arranged axially extending slots 27, 28 are provided in the stop plate 16, and the purpose of these grooves is to permit the dogs to move vertically with the plug 7 when the valve is in closed or closing position. Assuming that the valve is closed, as shown in Figure 1, the dogs 25, 26 are now in the slots 27, 28. On rotation of the shaft 19, the threads 23 will move upwardly in the cup 21, thus raising the plug 7, and this pulls the pads 10 and 11 away from the wall of the bore 4. Since the dogs 25 and 26 have moved upwardly out of the slots 27, 28, the collar 24 can rotate with the dogs. The dogs now ride on top of the flange 16, and are pressed into suitable recesses 26c in the flange 22, thus causing the plug to rotate until stops 29, 30 are engaged by the dogs. As long as the dogs 25 and 26 are in their respective grooves, the plug 7 cannot rotate, and only a vertical movement is imparted to the plug. Thus, the wedges 10 and 11 cannot be moved until they have been pulled away from the wall of the bore 4. Similarly, when the wedges are being pushed outwardly to seal the ports 2 and 3, there is no rotary motion during this outward spreading movement of the wedges, and consequently there will be no scoring or galling of the contacting metal surfaces.

After the plug is raised to its uppermost position with collar 24 against flange 22 (Figures 5 and 6) further turning of the shaft 19 in the same direction locks the threaded connection between the shaft and plug and causes the plug to begin to rotate counterclockwise as shown in Figures 2 and 3. The dogs 25 and 26 are carried by this initial rotatioinal movement into engagement with a pair of corners 27a and 28a (Figure 3) of the plate 16, which are at the intersection of one vertical side of the respective slots 27 and 28 with the horizontally extending upper surface 16a of the plate 16. These corners are adapted to slide against adjacent inclined lower corners 26d of the dogs so as to pivot the dogs up into engagement with the recesses 26c of the flange 22 (Figure 6). Continued rotation of the shaft 19 in the same direction continues such rotation of the plug, and the dogs are thereby carried horizontally in fixed relation with the flange 22 and in sliding engagement with the upper surface 16a of the plate 16 until the ends of the dogs furthest from the pins 25a and 26a engage fixed stops 29 and 30 (Figure 3) extending up from the plate 16 (Figure 4). This brings the plug port 15 into alignment with the valve body ports 2 and 3, and the valve is fully open. When the shaft 19 is turned the other way to close the valve, the engagement of the dogs with the flange 22 and upper surface of the plate 16 compels the plug to rotate with the shaft 19 until the collar 24 engages the stops 29 and 30 to stop rotation of the plug (Figure 2), in which position the dogs are again free to pivot downwardly out of engagement with flange 22 (Figure 5). Continued closing rotation of the shaft 19 forces the plug downwardly with the dogs sliding in the slots 27 and 28 to prevent rotation of the plug as it moves toward its lowermost fully closed position.

Although I have illustrated and described a present preferred embodiment of the invention, it will be recognized that the invention is not limited thereto but may be otherwise variously embodied and practiced within the scope of the following claims.

Having described my invention, I claim:

1. A valve comprising a valve body, said body having oppositely arranged fluid ports therein, and a bore intersecting said ports, a plug mounted in the bore, a pair of wedges on the plug, said plug and wedges having tapered engaging surfaces, said plug being slidable longitudinally relative to the wedges, a control shaft extending into the body, a pair of trunnions on the plug, said trunnions being journaled in the valve body, one of said trunnions and the control shaft having a threaded connection whereby rotation of the control shaft will slide the plug relative to the wedges, and said plug having a fluid passage extending therethrough, a dog secured to the plug and engageable with the control shaft whereby the plug is rotated with said shaft, said body having a slot therein receiving the dog in the lowered position of the plug, said dog moving out of the slot and engaging the control shaft in the raised position of the plug.

2. A valve comprising a valve body, said body having a pair of oppositely arranged fluid ports therein, and a bore intersecting said ports, a plug mounted in the bore, a pair of wedges on the plug, said plug and wedges having inclined engaging surfaces, a tongue and groove connection between the plug and the wedges, said plug having a fluid passage extending transversely therethrough, upper and lower trunnions on the plug, a control shaft extending into the valve body, external threads on the upper trunnion, said control shaft having internal threads to receive the threaded trunnion whereby rotation of the control shaft will slide said plug relative to the wedges, a dog pivotally attached to the upper trunnion, said dog being engageable with the control shaft in the raised position of the plug, said body having an annular slot receiving the dog to permit rotation of the plug with the dog engaging the control shaft, and a stop in said annular slot.

3. A valve comprising a hollow valve body with ports therethrough, a valve plug journalled in the body and axially movable therein with a passage through the plug for connecting said ports when the valve is open, elements movably mounted on and rotatable with the plug for sealing said ports when the valve is closed, said plug being in the form of a wedge positively engaging said elements to force both elements positively inwardly and radially as the plug is moved axially in one direction and to force both elements positively outwardly and radially as the plug is moved axially in the opposite direction, means engaging the port sealing elements to hold them against axial movement with the plug, and an axially extending spindle integral with the plug, a cam follower secured to the spindle, and cam track means mounted on the valve body, with said cam track extending parallel to the axis of the plug for causing the spindle and plug to move solely axially as the port sealing elements are seated and unseated, and then in a plane generally perpendicular to the plug axis for permitting rotational movement of the plug only when the port sealing elements are fully withdrawn and thereby protected against scoring or rubbing of their port engaging faces during the rotational movement.

4. A valve comprising a hollow valve body with ports therethrough, a valve plug journaled in the body and axially movable therein with a passage through the plug for connecting said ports when the valve is open, elements movably mounted on and rotatable with the plug for sealing said ports when the valve is closed, said plug being in interlocking wedge relation with said elements to force both elements positively inwardly in a directly radial direction as the plug is moved axially in one direction and to force both elements positively outwardly in a directly radial direction as the plug is moved axially in the opposite direction, means engaging the port sealing elements to hold them against axial movement with the plug, a dog pivotally secured to the plug, said dog being elongated generally in a plane substantially perpendicular to the axis of the plug, means for limiting pivotal movement of the dog so that it will remain generally in said plane, an operating shaft with threaded connections between said shaft and plug whereby rotation of the shaft while the plug is held against rotation causes the plug to move axially and whereby rotation of the shaft while it is locked to the plug causes the plug to rotate, means secured to the valve body and having an axially extending slot adapted to receive the dog to hold the plug against rotation as the plug moves into and away from closed position, said slotted means having a surface extending in place perpendicular to the plug axis and intersecting the slot to form a corner at the intersection, the dog being adapted to engage said corner and to be pivoted into locked engagement with an integrally connected portion of said shaft and to be held by said surface in such locked engagement as the dog slides along said surface, means limiting axial movement of the plug toward open position when the dog reaches a position where it is adjacent the corner and is aligned to be carried into locked engagement with said portion of the shaft and into sliding engagement with said surface when the plug rotates to open position, and means limiting rotational movement of the plug toward closed position when the dog reaches substantially the same said position.

5. A valve comprising a hollow valve body, a valve element journaled on the body and axially movable therein, the valve element being movable first rotationally and then only axially from open to closed position, and first only axially and then rotationally from closed to open position, a dog pivotally secured to the valve element, said dog being elongated generally in a plane perpendicular to the axis of the valve element, means for limiting pivotal movement of the dog so that it will remain generally in said plane, an operating shaft with threaded connection between said shaft and valve element whereby rotation of the shaft while the valve element is held against rotation causes the valve element to move axitlly and whereby rotation of the shaft while it is locked to the valve element causes the valve element to rotate, means secured to the valve body and having an axially extending slot adapted to receive the dog to hold the valve element against rotation as the valve element moves into and way from closed position, said slotted means having a surface extending in a plane substantially perpendicular to said axis and intersecting the slot to form a corner at the intersection, the dog being adapted to engage said corner and to be pivoted into locked engagement with an integrally connected portion of said shaft when the valve element begins to rotate toward open position and to be held by said surface in such locked engagement as the dog slides along said surface when the valve element rotates to and from open position, means limiting axial movement of the valve element toward open position when the log reaches a position where it is adjacent the corner and is aligned to be carried into locked engagement with said portion of the shaft and into sliding engagement with said surface when the valve element rotates to open position, and means limiting rotational movement of the valve element toward closed position when the dog reaches substantially the same said position.

6. A valve comprising a hollow valve body, a valve element journaled in the body and axially movable therein, the valve element being movable first rotationally and then only axially from open to closed position, and first only axially and then rotationally from closed to open position, a dog pivotally secured to the valve element with the pivotal axis extending in a plane generally perpendicular to the plug axis, said dog being elongated generally in a plane perpendicular to the axis of the valve element, means for limiting pivotal movement of the dog so that it will remain generally in said plane, an operating shaft with threaded connection between said shaft and valve element whereby rotation of the shaft while the valve element is held against rotation causes the valve element to move axially and whereby rotation of the shaft while it is locked to the valve element causes the valve element to rotate, means secured to the valve body and having an axially extending slot adapted to receive the dog to hold the valve element against rotation as the valve element moves into and away from closed position, said slotted means having a surface extending in a plane substantially perpendicular to said axis and intersecting the slot to form a corner at the intersection, means secured to the valve body to pivot the dog into locked engagement with an integrally connected portion of said shaft when the valve element begins to rotate toward open position, the dog being adapted to slide along and be held by said surface in such locked engagement when the valve element rotates to and from open position, means limiting axial movement of the valve element toward open position when the dog reaches a position where it is adjacent the corner and is aligned to be carried into locked engagement with said portion of the shaft and into sliding engagement with said surface when the valve element rotates to open position, and means limiting rotational movement of the valve element toward closed position when the dog reaches substantially the same said position.

7. A valve comprising a hollow valve body, a valve element journaled in the body and axially movable therein, the valve element being movable first rotationally and then only axially from open to closed position, and first only axially and then rotationally from closed to open position, a dog pivotally secured to the valve element, an operating shaft with threaded connection between said shaft and valve element whereby rotation of the shaft while the valve element is held against rotation causes the valve element to move axially and whereby rotation of the shaft while it is locked to the valve element causes the valve element to rotate, means secured to the valve body and having an axially extending slot adapted to receive the dog to hold the valve element against rotation as the valve element moves into and away from closed position, said slotted means having a surface extending in a plane substantially perpendicular to said axis and intersecting the slot to form a corner at the intersection, the dog being adapted to slidably engage said corner and thereby to be pivoted into locked engagement with an integrally connected portion of said shaft when valve element begins to rotate toward open position and to be held by said surface in such locked engagement as the dog slides along said surface when the valve element rotates to and from open position, means limiting axial movement of the valve element toward opened position when the dog reaches a position where it is adjacent the corner and is aligned to be carried into locked engagement with said portion of the shaft and into sliding engagement with said surface when the valve element rotates to open position, and means limiting rotational movement of the valve element toward closed position when the dog reaches substantially the same said position.

8. A plug-type valve comprising a hollow valve body with ports for passage of fluid therethrough, a valve plug with a passage therethrough to connect said ports for passage of fluid therethrough when the plug is in open position, the plug being mounted in the body for rotation about and axial movement along an axis which is fixed relative to the body, means positively holding the plug against radial movement relative to said axis, sealing elements for the respective ports mounted on and in wedge relation to the plug, each sealing element being interlocked with the plug against any movement relative to the plug except along a single straight path which is in a fixed position relative to the plug and is at an acute angle to the plug axis, so that rotation of the plug positively carries the sealing elements with the plug around the plug axis, so that axial movement of the plug in one direction positively wedges each of the sealing elements directly radially of said axis against the corresponding ports, and so that axial movement of the plug in the opposite direction positively wedges each of the sealing elements directly radially toward said axis out of engagement with said ports, thereby positively overcoming fluid pressure on the back of any sealing element tending to hold it against the corresponding port, means restraining the sealing elements against axial movement in the valve body but permitting the sealing elements to rotate with the plug and to move radially of the plug axis, and guide means limiting the plug to axial, non-rotative movement during movement of the plug to wedge the sealing elements into and out of engagement with the ports, but permitting rotational movement of the plug to swing the plug passage into and out of alignment with said ports while the plug is axially disposed to hold the sealing elements out of engagement with the ports.

9. A plug-type valve comprising a hollow valve body with a pair of opposite ports for passage of fluid therethrough, a valve plug with a passage therethrough to connect said ports for passage of fluid therethrough when the plug is in open position, the plug being mounted in the body for rotation about and axial movement along an axis which is fixed relative to the body, means positively holding the plug against radial movement relative to said axis, a pair of sealing elements for the respective ports mounted on opposite sides of and in wedge relation to the plug, each sealing element being in sliding, dovetail engagement with the plug for movement relative to the plug only along a single straight path which is in a fixed position relative to the plug and is at an acute angle to the plug axis, so that rotation of the plug positively carries the sealing elements with the plug around the plug axis, so that axial movement of the plug in one direction positively wedges each of the sealing elements directly radially of said axis against the corresponding ports, and so that axial movement of the plug in the opposite direction positively wedges each of the sealing elements directly radially toward said axis out of engagement with said ports, thereby positively overcoming fluid pressure on the back of any sealing element tending to hold it against the corresponding port, means in the valve body engaging and restraining the sealing elements against axial movement in the valve body but permitting the sealing elements to rotate with the plug and to move radially of the plug axis, and guide means limiting the plug to axial, non-rotative movement during movement of the plug to wedge the sealing elements into and out of engagement with the ports, but permitting rotational movement of the plug to swing the plug passage into and out of alignment with said ports while the plug is axially disposed to hold the sealing elements out of engagement with the ports.

10. A plug-type valve comprising a hollow valve body with a pair of opposite ports for passage of fluid therethrough, a valve plug with a passage therethrough to connect said ports for passage of fluid therethrough when the plug is in open position, the plug being mounted in the body for rotation about and axial movement along an axis which is fixed relative to the body, means positively holding the plug against radial movement relative to said axis, a pair of sealing elements for the respective ports mounted on opposite sides of and in wedge relation to the plug, each sealing element having a sliding dovetail connection with the plug extending centrally down the back of the plug at an acute angle to the plug axis and having a pair of flat surfaces extending parallel with and on both sides of the dovetail connection and extending directly behind substantial areas of the sealing element which engage and cover opposite sides of the corresponding port, and the plug having flat surfaces slidably engaging the said back surfaces of the sealing elements to wedge the sealing elements toward the ports, so that rotation of the plug positively carries the sealing elements with the plug around the plug axis, so that axial movement of the plug in one direction positively wedges each of the sealing elements directly radially of said axis against the corresponding ports, and so that axial movement of the plug in the opposite direction positively wedges each of the sealing elements directly radially toward said axis out of engagement with said ports, thereby positively overcoming fluid pressure on the back of any sealing element tending to hold it against the corresponding port, means in the valve body engaging and restraining the sealing elements against axial movement with the plug but permitting the sealing elements to rotate with the plug and to move radially of the plug axis, and guide means on the valve body limiting the plug to axial, nonrotative movement during movement of the plug to wedge the sealing elements into and out of engagement with the ports, but permitting rotational movement of the plug to swing the plug passage into and out of alignment with said ports while the plug is axially disposed to hold the sealing elements out of engagement with the ports.

11. A plug-type valve comprising a hollow valve body with ports for passage of fluid therethrough, a valve plug with a passage therethrough to connect said ports for passage of fluid therethrough when the plug is in open position, the plug being mounted in the body for rotation about and axial movement along an axis which is fixed relative to the body, means positively holding the plug against radial movement relative to said axis, a port-sealing element mounted on and in wedge relation to the plug, said sealing element being interlocked with the plug against any movement relative to the plug except along a single straight path which is in a fixed position relative to the plug and is at an acute angle to the plug axis, so that rotation of the plug positively carries the sealing element with the plug around the plug axis, so that axial movement of the plug in one direction positively wedges the sealing element directly radially of said axis against one of the ports, and so that axial movement of the plug in the opposite direction positively wedges the sealing element directly radially towards said axis out of engagement with a port which it has been sealing, thereby positively overcoming fluid pressure on the back of the sealing element tending to hold it against a port which it has been sealing, means restraining the sealing element against axial movement with the plug but permitting the sealing element to rotate with the plug and to move radially of the plug axis, and guide means limiting the plug to axial, nonrotative movement during movement of the plug to wedge the sealing element into and out of engagement with a port, but permitting rotational movement of the plug to swing the plug passage into and out of alignment with said ports while the plug is axially disposed to hold the sealing element of engagement with the ports.

JOSEPH HEINEN.

REFERENCES CITED

The following references are of record in the file of this patent:

UNITED STATES PATENTS

| Number | Name | Date |
|---|---|---|
| Re. 22,455 | Wilson | Mar. 14, 1944 |
| 305,078 | Homan | Sept. 16, 1884 |
| 622,875 | Woerner | Apr. 11, 1899 |
| 671,443 | Jennings | Apr. 9, 1901 |
| 681,987 | Schumann | Sept. 3, 1901 |
| 733,905 | Erdman | July 14, 1903 |
| 1,524,267 | Loop | Jan. 27, 1925 |
| 1,892,574 | Huhn | Dec. 27, 1932 |
| 1,998,882 | Merrill | Apr. 23, 1935 |
| 2,100,996 | Moore | Nov. 30, 1937 |
| 2,222,626 | Mueller | Nov. 26, 1940 |
| 2,238,385 | Foster | Apr. 15, 1941 |
| 2,308,300 | Parker | Jan. 12, 1943 |
| 2,314,759 | Bishoff | Mar. 23, 1943 |
| 2,385,993 | Johnson | Oct. 2, 1945 |

FOREIGN PATENTS

| Number | Country | Date |
|---|---|---|
| 11,764 | Great Britain | of 1905 |
| 551,406 | Germany | of 1930 |
| 799,346 | France | Dec. 16, 1935 |